(12) United States Patent
Ying et al.

(10) Patent No.: US 11,860,064 B2
(45) Date of Patent: Jan. 2, 2024

(54) BATTERY PACK LEAKAGE DETECTION SYSTEM AND DETECTION METHOD BASED ON TRACER GAS CUMULATIVE TEST

(71) Applicant: Uni-Helium Test Technology (Shanghai) Co., LTD., Shanghai (CN)

(72) Inventors: Wu Ying, Shanghai (CN); Tingguang Jin, Shanghai (CN); Ye Yuan, Shanghai (CN); Zhangxiang Che, Shanghai (CN)

(73) Assignee: UNI-HELIUM TEST TECHNOLOGY (SHANGHAI) CO., LTD., Shanghai (CN)

( * ) Notice: Subject to any disclaimer, the term of this patent is extended or adjusted under 35 U.S.C. 154(b) by 3 days.

(21) Appl. No.: 17/581,849

(22) Filed: Jan. 21, 2022

(65) Prior Publication Data

US 2023/0003602 A1 Jan. 5, 2023

(30) Foreign Application Priority Data

Jul. 1, 2021 (CN) .......................... 202110747794.8

(51) Int. Cl.
*G01M 3/22* (2006.01)
*H01M 10/42* (2006.01)
(Continued)

(52) U.S. Cl.
CPC ............ *G01M 3/223* (2013.01); *G01M 3/202* (2013.01); *G01M 3/229* (2013.01); *H01M 10/4228* (2013.01); *H01M 50/183* (2021.01)

(58) Field of Classification Search
CPC ........ G01M 3/20; G01M 3/202; G01M 3/226; G01M 3/229; H01M 10/4228
See application file for complete search history.

(56) References Cited

U.S. PATENT DOCUMENTS 7,905,132 B1* 3/2011 Chamberlain ........ G01M 3/205
 73/40.7
8,261,594 B2* 9/2012 Maehira ................ G01M 3/205
 73/49.3

(Continued)

FOREIGN PATENT DOCUMENTS

CN 101738294 A 6/2010
CN 202631207 U 12/2012
(Continued)

OTHER PUBLICATIONS

Liao et al., A Detecting Method and Device, Mar. 2011, FIT Computer Translation (Year: 2011).*

*Primary Examiner* — Erika J. Villaluna
(74) *Attorney, Agent, or Firm* — Cheng-Ju Chiang

(57) ABSTRACT

A battery pack leakage detection system and detection method are provided. The system includes a test container, a gas filling subsystem, a gas stirring subsystem and a test analysis subsystem. The method can test the sealing performance of the battery pack under the atmospheric pressure, so that the battery pack can meet the corresponding sealing grade requirements of IP67 and IP68. The method not only solves the problem that the traditional gas detection method cannot meet the test requirements of IP67 and IP68 due to insufficient measurement precision, but also solves the problem that the traditional vacuum helium detection method will damage the battery cells in the battery pack.

16 Claims, 5 Drawing Sheets

(51) Int. Cl.
*G01M 3/20* (2006.01)
*H01M 50/183* (2021.01)

(56) References Cited

U.S. PATENT DOCUMENTS 11,181,434 B2 * 11/2021 Yao .................. G01M 3/229
2022/0090980 A1 * 3/2022 Thenard ............. G01M 3/227

FOREIGN PATENT DOCUMENTS

| | | |
|---|---|---|
| CN | 109425469 A | 3/2019 |
| CN | 210426902 U | 4/2020 |
| CN | 111912577 A | 11/2020 |
| JP | 2008-20422 A | 1/2008 |

* cited by examiner

BATTERY PACK LEAKAGE DETECTION SYSTEM AND DETECTION METHOD BASED ON TRACER GAS CUMULATIVE TEST

CROSS-REFERENCE TO RELATED APPLICATION

This application is based upon and claims the priority to Chinese Patent Application No. 202110747794.8 filed on Jul. 1, 2021, which is incorporated herein by reference in its entirety.

TECHNICAL FIELD

The present invention relates to the technical field of battery pack leakage detection, and in particular, to a battery pack leakage detection system and detection method based on tracer gas cumulative test.

BACKGROUND OF THE INVENTION

With the rapid development of new energy vehicles, the waterproof protection requirement on battery packs is higher and higher, and the protection requirements of IP67 and even IP68 are provided. The traditional gas detection method is influenced by various factors such as environmental temperature change, pack volume change and the like, and is therefore far from meeting the detection requirements. The market needs a detection method with higher precision to realize reliable waterproof grade tests corresponding to IP67 and IP68.

Helium belongs to extremely active gas molecules and is easy to escape from tiny fine leakage positions. In order to detect the tightness of a workpiece, helium is commonly used in industry as a tracer gas, mass spectrometry is carried out on the workpiece in a vacuum box, and high-precision leakage rate measurement is rapidly realized. This method is called box vacuum helium test.

However, the method needs to be carried out under vacuum, but the battery pack is easy to deform and cannot bear larger internal and external pressure difference, so that the capacity of synchronous vacuum inside and outside the battery pack is needed, to cause the internal and external pressure difference to be kept within a design range.

However, this will bring new problem. If the inside of the battery pack is in a vacuum state, the battery cells in the battery pack are placed in the vacuum state, and the battery cells begin to expand under the action of pressure difference, so that the safety gap of the battery cells will be damaged, and the safety of the battery pack is seriously endangered.

SUMMARY OF THE INVENTION

In view of the above, the present invention provides a battery pack leakage detection system and detection method based on tracer gas cumulative test.

A first embodiment of the present invention provides a battery pack leakage detection system, including:
- a test container provided with a test cavity configured for accommodating the battery pack therein;
- a gas filling subsystem configured for filling an interior of the battery pack with a quantity of tracer gas;
- a gas stirring subsystem arranged in the test cavity and configured for stir the air in the test cavity, such that the leaked tracer gas that leaks out from the battery pack into the test cavity is accelerated to mix with the air in the test cavity for realizing the uniform distribution of the leaked tracer gas in the test cavity; and
- a test analysis subsystem configured for sampling the mixed gas in the test cavity and analyzing the sampled gas to obtain the content of the leaked tracer gas in the test cavity, so as to determine whether the sealing requirement of the battery pack is satisfied or not according to the content of the leaked tracer gas in the test cavity.

Further, the gas filling subsystem includes a vacuumizing device used to vacuumize the interior of the battery pack, a gas filling device used to fill the tracer gas into the interior of the battery pack, a pressure monitoring device used to monitor the pressure of the tracer gas in the interior of the battery pack, and a concentration monitoring device used to monitor the concentration of the tracer gas in the interior of the battery pack.

Further, the gas filling subsystem is further configured for ensuring that, after the tracer gas is filled into the battery pack, an internal pressure of the interior of the battery pack is greater than a pressure in the test cavity.

Further, the gas stirring subsystem includes at least one stirring fan.

Further, an upper side of the test container is provided with a gas exhaust port configured for discharging the leaked tracer gas out of the test cavity.

Further, a conveying mechanism is provided in the test cavity, and the conveying mechanism is configured for conveying the battery pack to enter or leave the test cavity.

Further, the test analysis subsystem is a mass spectrum test analysis subsystem.

Further, the test analysis subsystem includes a mass spectrometer and a computing device, wherein the mass spectrometer is configured for sampling the mixed gas in the test cavity and performing mass spectrum analysis on the sampled gas to determine the content of the leaked tracer gas in the test cavity, the computing device is configured for calculating to obtain the product leakage rate of the battery pack.

Further, the tracer gas is helium or hydrogen.

A second embodiment of the present invention provides a battery pack leakage detection method, including the following steps:
- step 1: filling a tracer gas into an interior of the battery pack;
- step 2: after the battery pack is filled with the tracer gas, placing the battery pack into a test cavity;
- step 3: stirring the air in the test cavity to accelerate the leaked tracer gas that leaks out from the battery pack to mix with the air in the test cavity such that the leaked tracer gas is uniformly distributed in the test cavity; and
- step 4: after a specified time period for testing is reached, sampling the mixed gas in the test cavity and analyzing the sampled gas to obtain the content of the leaked tracer gas in the test cavity, so as to determine whether the sealing requirement of the battery pack is satisfied or not according to the content of the leaked tracer gas in the test cavity.

Further, in step 2, after the tracer gas is filled into the battery pack, an internal pressure of the interior of the battery pack is greater than a pressure in the test cavity, such that the filled tracer gas in the battery pack will leak into the test cavity through a potential leakage hole of the battery pack under the action of pressure difference, wherein the pressure in the test cavity is atmospheric pressure.

Further, in step 4, the mixed gas in the test cavity is sampled in real-time during testing, and a mass spectrometer is provided to perform mass spectrum analysis in real-time on the sampled gas to obtain the rate of change of the content of the leaked tracer gas in the test cavity.

Further, a product leakage rate of the battery pack is calculated by the following calculation formula:

$$Q = \Delta C * P_t * V$$

Q: the product leakage rate, in unit of mbar·l/s, or Pa·m³/s;
$\Delta C$: the rate of change of the content of the tracer gas in the test cavity, in unit of %/s;
$P_t$: the pressure in the test cavity, in unit of Pa;
V: the net volume in the test cavity, in unit of m³;
if the product leakage rate is lower than a specified value, then it is determined that the sealing requirement of the battery pack is satisfied; and
if the product leakage rate is greater than the specified value, then it is determined that the sealing requirement of the battery pack is not satisfied.

A third embodiment of the present invention provides a battery pack leakage detection method, including the following steps:

step 1: placing the battery pack into a test cavity and connecting a gas filling device with a gas filling hole of the battery pack through a gas filling pipe;

step 2: filling a tracer gas into an interior of the battery pack;

step 3: after the battery pack is filled with the tracer gas, stirring the air in the test cavity to accelerate the leaked tracer gas that leaks out from the battery pack to mix with the air in the test cavity such that the leaked tracer gas is uniformly distributed in the test cavity; and step 4: after a specified time period for testing is reached, sampling the mixed gas in the test cavity and analyzing the sampled gas to obtain the content of the leaked tracer gas in the test cavity, so as to determine whether the sealing requirement of the battery pack is satisfied or not according to the content of the leaked tracer gas in the test cavity.

Further, in step 2, after the tracer gas is filled into the battery pack, an internal pressure of the interior of the battery pack is greater than a pressure in the test cavity, such that the filled tracer gas in the battery pack will leak into the test cavity through a potential leakage hole of the battery pack under the action of pressure difference, wherein the pressure in the test cavity is atmospheric pressure.

Further, in step 1, the gas filling pipe is a hose.

Further, in step 4, the mixed gas in the test cavity is sampled in real-time during testing, and a mass spectrometer is provided to perform mass spectrum analysis in real-time on the sampled gas to obtain the rate of change of the content of the leaked tracer gas in the test cavity.

Further, a product leakage rate of the battery pack is calculated by the following calculation formula:

$$Q = \Delta C * P_t * V$$

Q: the product leakage rate, in unit of mbar·l/s, or Pa·m³/s;
$\Delta C$: the rate of change of the content of the tracer gas in the test cavity, in unit of %/s;
$P_t$: the pressure in the test cavity, in unit of Pa;
V: the net volume in the test cavity, in unit of m³;
if the product leakage rate is lower than a specified value, then it is determined that the sealing requirement of the battery pack is satisfied; and
if the product leakage rate is greater than the specified value, then it is determined that the sealing requirement of the battery pack is not satisfied.

The beneficial effects of the present invention are: the leakage detection method of the present invention can test the sealing performance of the battery pack under the atmospheric pressure, so that the battery pack can meet the corresponding sealing grade requirements of IP67 and IP68. The method not only solves the problem that the traditional gas detection method cannot meet the test requirements of IP67 and IP68 due to insufficient measurement precision, but also solves the problem that the traditional vacuum helium detection method will damage the battery cells in the battery pack.

BRIEF DESCRIPTION OF THE DRAWINGS

Hereinafter, some specific embodiments of the present invention will be described in detail in an exemplary but not restrictive manner with reference to the accompanying drawings. Those skilled in the art should understand that these drawings are not necessarily drawn to scale. In the drawings.

DETAILED DESCRIPTION OF PREFERRED EMBODIMENTS

The present invention is further described in detail with reference to the following specific embodiments and the accompanying drawings. The procedures, conditions, experimental methods and the like for carrying out the present invention are general knowledge and common general knowledge in the art except for the contents specifically mentioned below, and also it is understood that the present invention is not particularly limited.

First Embodiment

Figure 1:
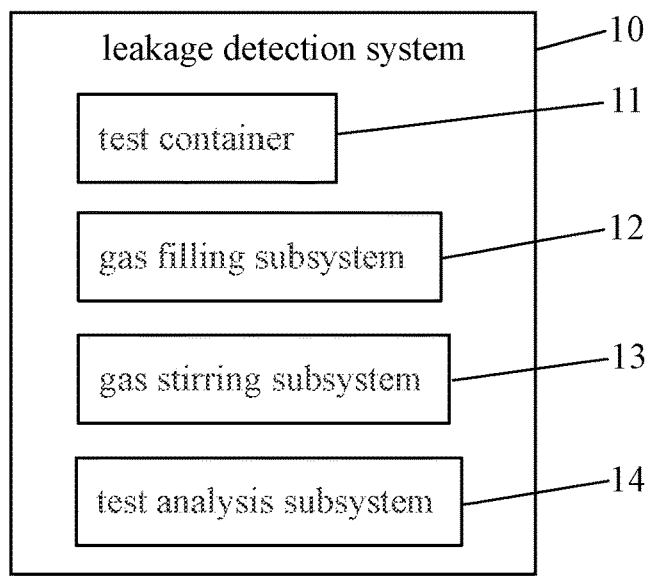
FIG. 1 is a block diagram of a battery pack leakage detection system based on tracer gas cumulative test according to a first embodiment of the present invention.
Figure 2:
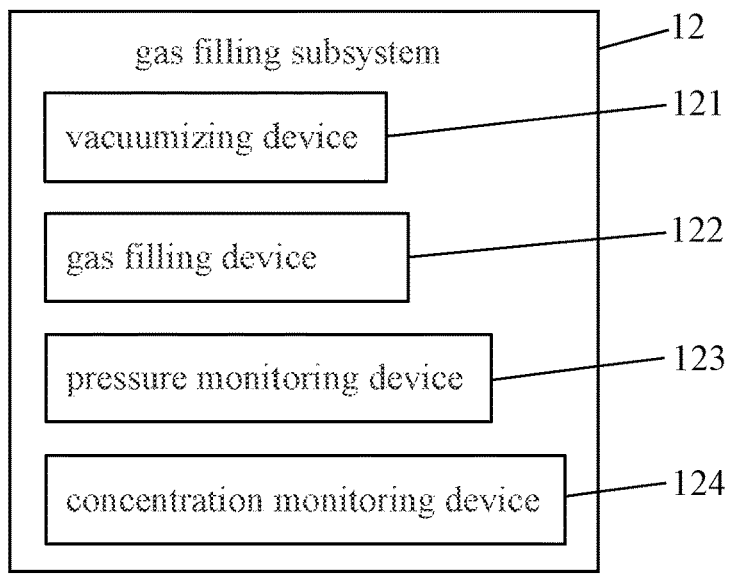
FIG. 2 is a block diagram of a gas filling subsystem of the battery pack leakage detection system shown in FIG. 1.
Figure 3:
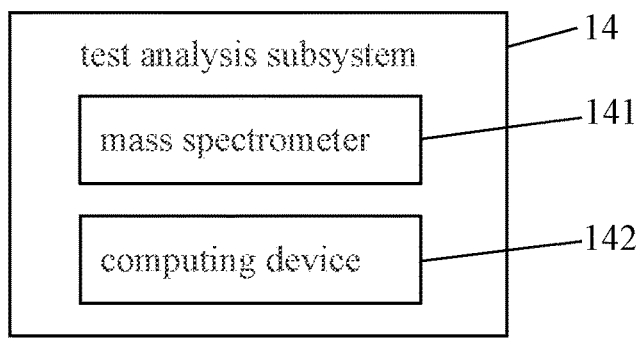
FIG. 3 is a block diagram of a test analysis subsystem of the battery pack leakage detection system shown in FIG. 1.

Referring to FIG. 1 to FIG. 3, a first embodiment of the present invention relates to a battery pack leakage detection system based on tracer gas cumulative test. The leakage detection system 10 is used to detect whether the sealing requirement of the battery pack 20 is satisfied or not. The battery pack 20 may be typically a vehicle battery pack that can be used in vehicles. The leakage detection system 10 includes a test container 11, a gas filling subsystem 12, a gas stirring subsystem 13, and a test analysis subsystem 14.

The gas filling subsystem 12 is used to fill an interior of the battery pack 20 with a quantity of tracer gas, wherein the tracer gas may be helium or hydrogen or other gases which can serve as a tracer gas. Specifically, in this embodiment, the gas filling subsystem 12 includes a vacuumizing device 121 (such as a vacuum pump) used to vacuumize the interior of the battery pack 20, a gas filling device 122 used to fill the tracer gas into the interior of the battery pack 20, a pressure monitoring device 123 used to monitor the pressure of the tracer gas in the interior of the battery pack 20, and a concentration monitoring device 124 used to monitor the concentration of the tracer gas in the interior of the battery pack 20. Because the internal volume of the battery pack 20 is relatively large and the inner structure of the battery pack 20 is relatively complicated, the gas filling subsystem 12 needs to guarantee the filled tracer gas to be evenly distributed in the battery pack 20.

After the tracer gas is filled into the battery pack 20, the internal pressure of the interior of the battery pack 20 is greater than the pressure in the test cavity 111, and the tracer gas is distributed evenly in the battery pack 20, wherein the pressure in the test cavity 111 is atmospheric pressure. In an example, the battery pack 20 is filled with the tracer gas before it is placed into the test cavity 111. In another example, the battery pack 20 is filled with the tracer gas after it is placed into the test cavity 111. That is, filling the tracer into the battery pack 20 can be done either outside the test cavity 111 or inside the test cavity 111.

The test container 11 is used to carry out the cumulative test on the battery pack 20 filled with the tracer gas, so as to determine whether the sealing requirement of the battery pack 20 is satisfied or not. A test cavity 111 used to accommodate the battery pack 20 is provided inside the test container 11. If the sealing performance of the battery pack 20 is not good, the filled tracer gas will leak out from the leakage hole of the battery pack 20 to the test cavity 111, the leaked tracer gas will accumulate in the test cavity 111, and the content of the tracer gas in the test cavity 111 will increase.

The gas stirring subsystem 13 is arranged in the test cavity 111 of the test container 11. The gas stirring subsystem 13 is used to stir the air in the test cavity 111, so that the leaked tracer gas that leaks out from the battery pack 20 into the test cavity 111, if any, is accelerated to mix with the air in the test cavity 111 for rapidly realizing the uniform distribution of the leaked tracer gas in the test cavity 111. Specifically, in this embodiment, the gas stirring subsystem 13 includes at least one stirring fan 131 used for stirring the leaked tracer gas so that the leaked tracer gas is uniformly distributed in the test cavity 111. In a specific embodiment, there are a plurality of stirring fans 131 arranged and distributed in the test cavity 111, and the position distribution and the opening frequency of the stirring fans 131 can be adjusted according to different sizes and/or shapes of the test container 11. For example, the stirring fans 131 may be mounted to an inner surface of a top plate (not labelled) of the test container 11. During testing, the stirring fans 131 are started in a specific frequency and mode to stir the air in the test cavity 111 to accelerate air mixing, so that the leaked tracer gas will be quickly and uniformly distributed in the test cavity 111.

The test container 11 is a closed box for gas stirring and accumulation testing. Specifically, the test container 11 is provided with a door 112 at one side thereof for the entrance and exit of the battery pack 20. The upper side of the test container 11 is provided with a gas exhaust port 114 used to discharge the leaked tracer gas out of the test cavity 111 after the leakage detection testing is finished, so that before the next leakage detection testing begins, there is no any tracer gas in the test cavity 111. The gas exhaust port 114 may be provided through the top plate of the test container 11. A support frame 15 may be provided below the test container 11, and the test container 11 is supported on the support frame 15. Further, a conveying mechanism 113 may be provided in the test cavity 111, and the conveying mechanism 113 is used to convey the battery pack 20 to enter or leave the test cavity 111.

After the tracer gas is filled into the battery pack 20, the battery pack 20 filled with the tracer gas is placed into the test cavity 111, and the gas stirring subsystem 13 starts to work to accelerate the gas flow in the test cavity 111. Because the internal pressure of the interior of the battery pack 20 is greater than the pressure in the test cavity 111, the tracer gas in the battery pack 20 will leak into the test cavity 111 through the potential leakage hole of the battery pack 20 under the action of pressure difference and is mixed with the air in the test cavity 111. Under the stirring action of the gas stirring subsystem 13, the mixing between the leaked tracer gas and the air in the test cavity 111 is quicker and more uniform, so that the leaked tracer gas is uniformly distributed in the test cavity 111.

The test analysis subsystem 14 is used to sample the mixed gas in the test cavity 111 and analyze the sampled gas to obtain the content of the leaked tracer gas in the test cavity 111, so as to determine whether the sealing requirement of the battery pack 20 is satisfied or not according to the content of the leaked tracer gas in the test cavity 111. The test analysis subsystem 14 may be typically a mass spectrum test analysis subsystem. In this embodiment, the test analysis subsystem 14 includes a mass spectrometer 141 which may be a helium mass spectrometer or a hydrogen mass spectrometer and a computing device 142 which may be a computer. The mass spectrometer 141 is used to sample the mixed gas in the test cavity 111 and perform mass spectrum analysis on the sampled gas to determine the content of the leaked tracer gas in the test cavity 111. The computing device 142 is used to calculate by the following formula to obtain the product leakage rate of the battery pack 20.

$$Q = \Delta C * P_t * V$$

Q: the product leakage rate, typically in unit of mbar·l/s, or Pa·m$^3$/s;

$\Delta C$: the rate of change of the content of the tracer gas in the test cavity 111, typically in unit of %/s;

$P_t$: the pressure in the test cavity 111, typically in unit of Pa;

V: the net volume in the test cavity 111, typically in unit of m$^3$.

Based on the above leakage detection system, the present invention further provides a battery pack leakage detection method based on tracer gas cumulative test, which will be described below.

Second Embodiment

Figure 4:
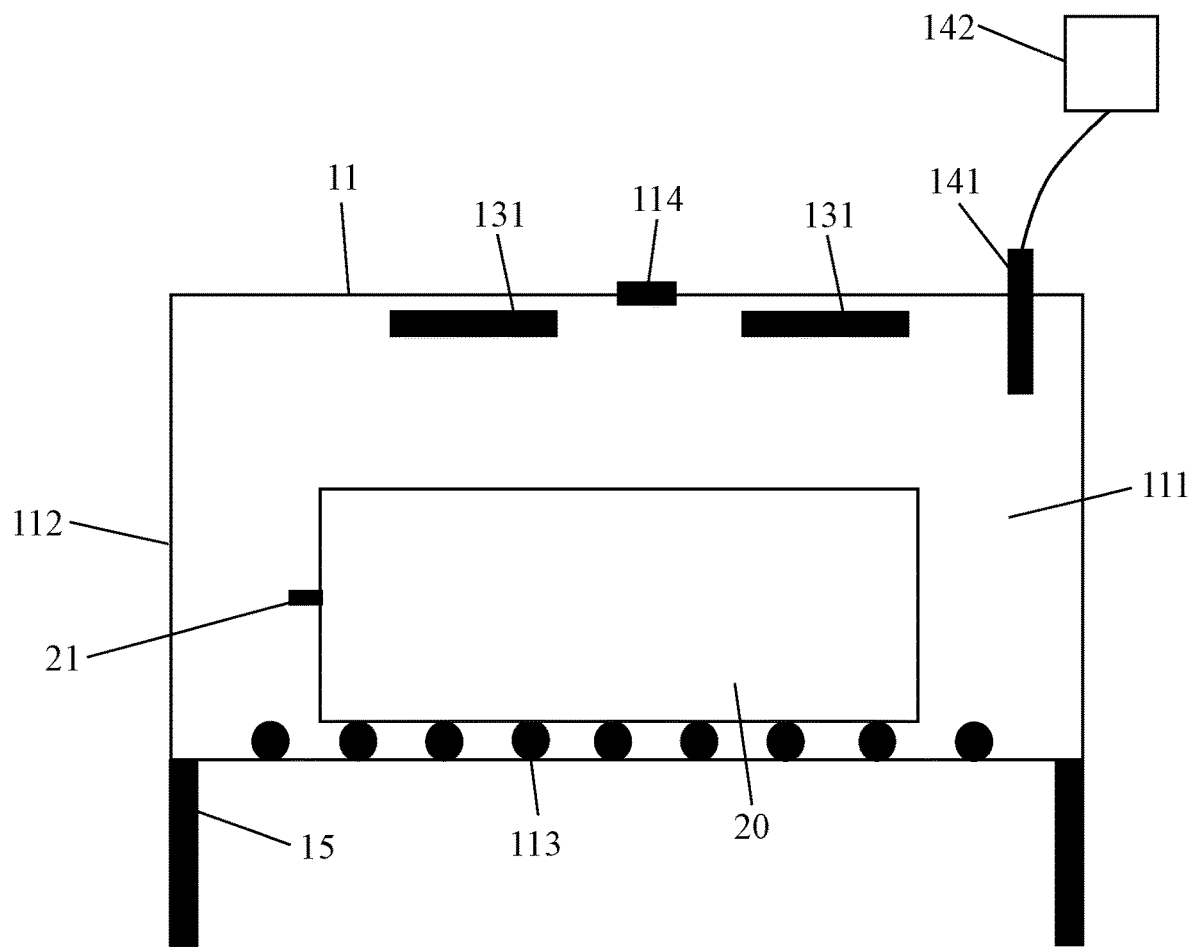
FIG. 4 is a schematic diagram of the structure used for carrying out a battery pack leakage detection method according to a second embodiment of the present invention.
Figure 5:
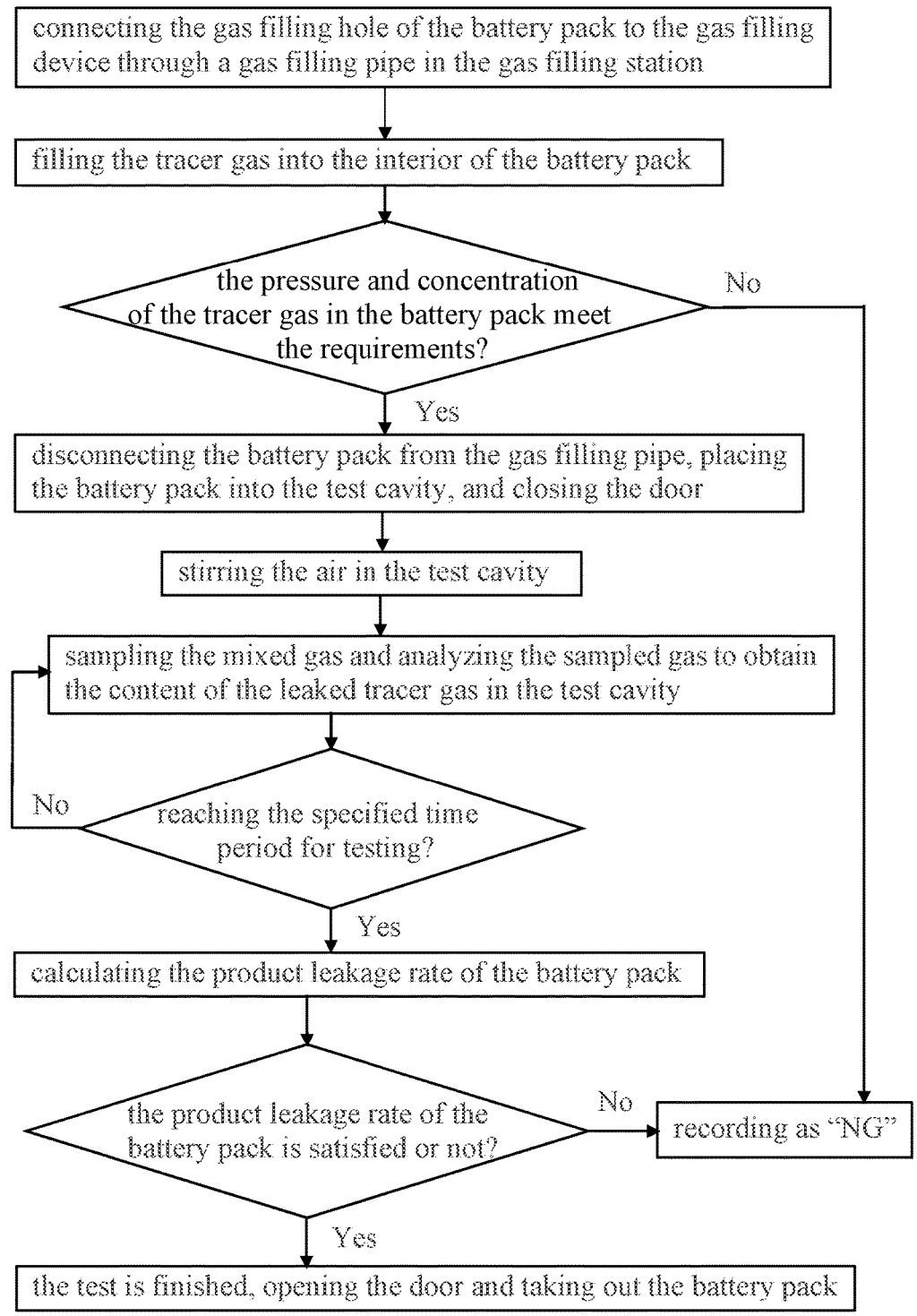
FIG. 5 is a flow chart of the battery pack leakage detection method according to the second embodiment of the present invention.

Referring to FIG. 4 to FIG. 5, a second embodiment of the present invention relates to a battery pack leakage detection method based on tracer gas cumulative test. In this embodiment, the battery pack 20 is filled with the tracer gas before it is placed into the test cavity 111. That is, the battery pack 20 is filled with the tracer gas at the outside of the test container 11, and after being filled with the tracer gas, the battery pack 20 is then placed into the test container 11 for leakage detection testing. The leakage detection method includes the following steps:

step 1: filling the tracer gas into the interior of the battery pack 20;

Specifically, in step 1, the gas filling device 122 is firstly connected to the gas filling hole 21 of the battery pack 20 through a gas filling pipe 125 in the gas filling station, so that a certain amount of the tracer gas is filled into the interior of the battery pack 20 through the gas filling device 122 and the gas filling pipe 125 at the outside of the test container 11, and the filled tracer gas is uniformly distributed in the battery pack 20, wherein the tracer gas may be helium or hydrogen or other gases which can serve as a tracer gas, and the gas filling pipe 125 may be a hose. During filling of the tracer gas, the pressure and concentration of the tracer gas in the battery pack 20 are monitored respectively by the pressure monitoring device 123 and the concentration monitoring device 124 until the pressure and concentration of the tracer gas in the battery pack 20 meet preset requirements. After the tracer gas is filled into the battery pack 20, the battery pack 20 is disconnected from the gas filling pipe 125. After the tracer gas is filled into the battery pack 20, the internal pressure of the interior of the battery pack 20 is greater than the pressure in the test cavity 111, so that the filled tracer gas in the battery pack 20 will leak into the test cavity 111 through the potential leakage hole of the battery pack 20 under the action of pressure difference, wherein the pressure in the test cavity 111 is atmospheric pressure.

step 2: after the battery pack 20 is filled with the tracer gas, placing the battery pack 20 into the test cavity 111;

Specifically, in step 2, after the battery pack 20 is filled with the tracer gas, the battery pack 20 is placed into the test cavity 111, wherein the battery pack 20 may be conveyed to enter the test cavity 111 through the conveying mechanism 113, and then the door 112 of the test container 11 is closed.

step 3: stirring the air in the test cavity 111 to accelerate the leaked tracer gas that leaks out from the battery pack 20 to mix with the air in the test cavity 111 such that the leaked tracer gas is uniformly distributed in the test cavity 111;

Specifically, in step 3, at least one stirring fan 131 may be employed and arranged in the test cavity 111 in order to stir the air in the test cavity 111 to realize the uniform distribution of the leaked tracer gas in the test cavity 111.

step 4: after the specified time period for testing is reached, sampling the mixed gas in the test cavity 111 and analyzing the sampled gas to obtain the content of the leaked tracer gas in the test cavity 111, so as to determine whether the sealing requirement of the battery pack 20 is satisfied or not according to the content of the leaked tracer gas in the test cavity 111.

Specifically, in step 4, as an example, the mass spectrometer 141 is used to sample the mixed gas in the test cavity 111 in real-time during testing and perform mass spectrum analysis in real-time on the sampled gas to obtain the rate of change of the content of the leaked tracer gas in the test cavity 111. Finally, the product leakage rate of the battery pack 20 is calculated by the following calculation formula:

$$Q = \Delta C * P_t * V$$

Q: the product leakage rate, in unit of mbar·l/s, or Pa·m$^3$/s;
$\Delta C$: the rate of change of the content of the tracer gas in the test cavity 111, in unit of %/s;
$P_t$: the pressure in the test cavity 111, in unit of Pa;
V: the net volume in the test cavity 111, in unit of m$^3$.

step 5: after the test is finished, opening the door 112 of the test container 11 and taking the battery pack 20 out of the test container 11.

Through the above leakage detection testing, if the product leakage rate is lower than a specified value, then it is determined that the sealing requirement of the battery pack is satisfied; if the product leakage rate is greater than the specified value, then it is determined that the sealing requirement of the battery pack is not satisfied.

Third Embodiment

Figure 6:
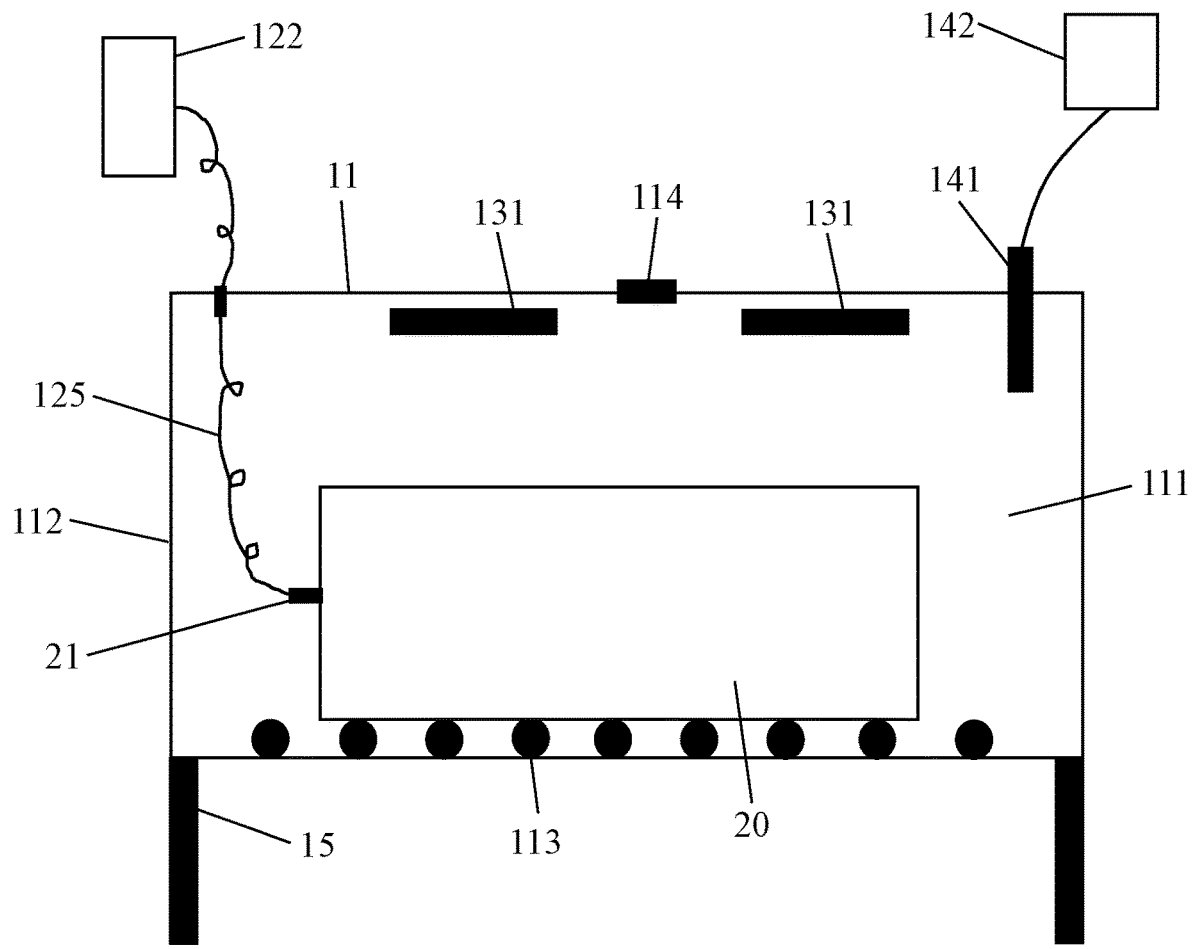
FIG. 6 is a schematic diagram of the structure used for carrying out a battery pack leakage detection method according to a third embodiment of the present invention.
Figure 7:
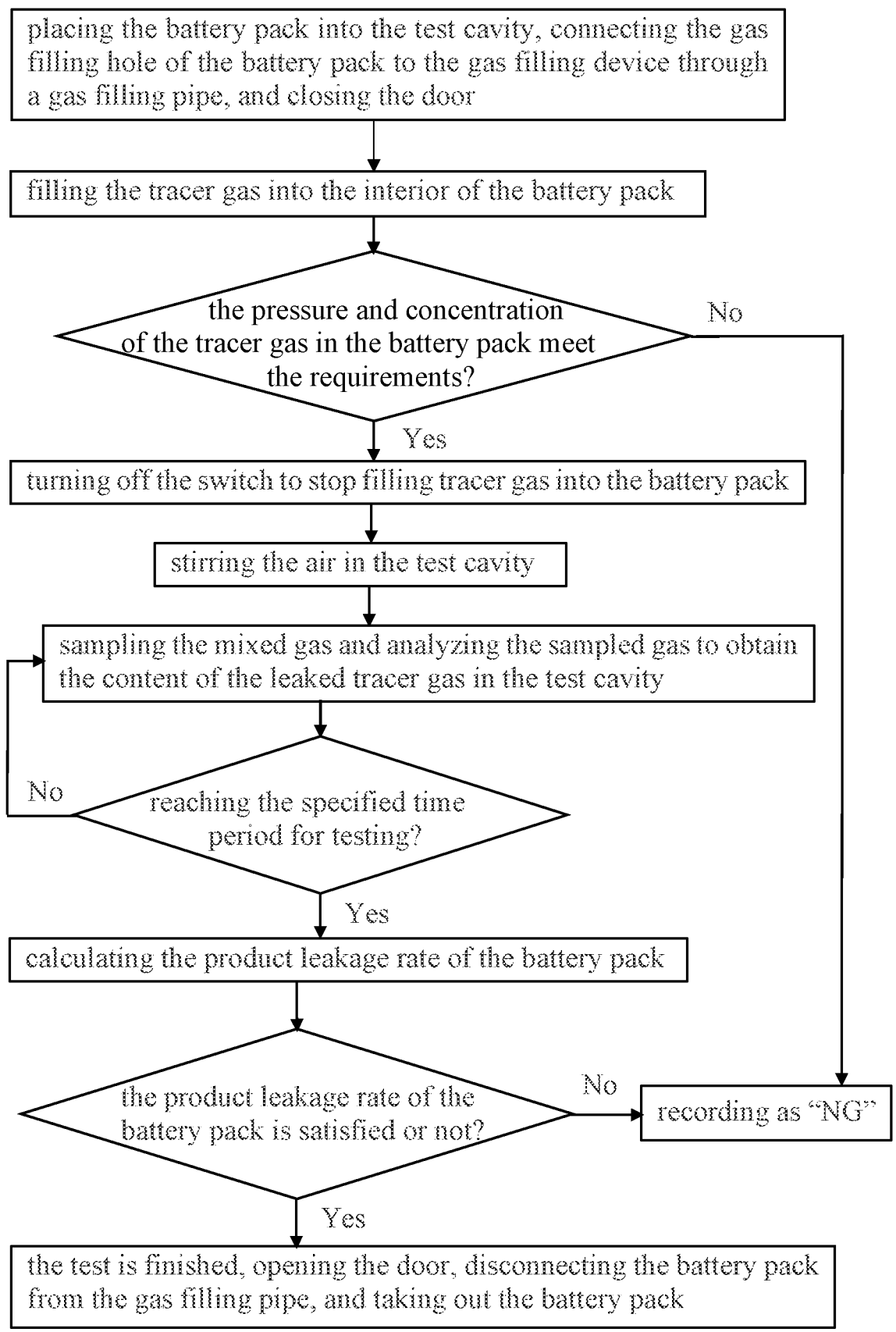
FIG. 7 is a flow chart of the battery pack leakage detection method according to the third embodiment of the present invention.

Referring to FIG. 6 to FIG. 7, a third embodiment of the present invention relates to a battery pack leakage detection method based on tracer gas cumulative test. In this embodiment, the battery pack 20 is filled with the tracer gas after it is placed into the test cavity 111. That is, the battery pack 20 without being filled with the tracer gas is placed into the test container 11, and then the battery pack 20 is filled with the tracer gas at the inside of the test container 11. The leakage detection method includes the following steps:

step 1: placing the battery pack 20 into the test cavity 111 and connecting the gas filling device 122 with the gas filling hole 21 of the battery pack 20 through a gas filling pipe 125;

Specifically, in step 1, the battery pack 20 may be conveyed to enter the test cavity 111 through the conveying mechanism 113, and after connecting the gas filling device 122 with the gas filling hole 21 of the battery pack 20 through the gas filling pipe 125, the door 112 of the test container 11 is closed, wherein the gas filling pipe 125 may be a hose.

step 2: filling the tracer gas into the interior of the battery pack 20;

Specifically, in step 2, a certain amount of the tracer gas is filled into the interior of the battery pack 20 through the gas filling device 122 and the gas filling pipe 125 at the inside of the test container 11, and the filled tracer gas is uniformly distributed in the battery pack 20, wherein the tracer gas may be helium or hydrogen or other gases which can serve as a tracer gas. During filling of the tracer gas, the pressure and concentration of the tracer gas in the battery pack 20 are monitored respectively by the pressure monitoring device 123 and the concentration monitoring device 124 until the pressure and concentration of the tracer gas in the battery pack 20 meet preset requirements. After the battery pack 20 is filled with the tracer gas, the connection between the gas filling device 122 and the gas filling pipe 125 is cut off, for example, a switch (not shown) provided on the gas filling device 122 or on the gas filling pipe 125 is turned off, so that the filled tracer gas will not escape through the gas filling pipe 125. After the tracer gas is filled into the battery pack 20, the internal pressure of the interior of the battery pack 20 is greater than the pressure in the test cavity 111, so that the filled tracer gas in the battery pack 20 will leak into the test cavity 111 through the potential leakage hole of the battery pack 20 under the action of pressure difference, wherein the pressure in the test cavity 111 is atmospheric pressure.

step 3: after the battery pack 20 is filled with the tracer gas, stirring the air in the test cavity 111 to accelerate the leaked tracer gas that leaks out from the battery pack 20 to mix with the air in the test cavity 111 such that the leaked tracer gas is uniformly distributed in the test cavity 111;

Specifically, in step 3, at least one stirring fan 131 may be employed and arranged in the test cavity 111 in order to stir the air in the test cavity 111 to realize the uniform distribution of the leaked tracer gas in the test cavity 111.

step 4: after the specified time period for testing is reached, sampling the mixed gas in the test cavity 111 and analyzing the sampled gas to obtain the content of the leaked tracer gas in the test cavity 111, so as to determine whether the sealing requirement of the battery pack 20 is satisfied or not according to the content of the leaked tracer gas in the test cavity 111.

Specifically, in step 4, as an example, the mass spectrometer 141 is used to sample the mixed gas in the test cavity 111 in real-time during testing and perform mass spectrum analysis in real-time on the sampled gas to obtain the rate of change of the content of the leaked tracer gas in the test cavity 111. Finally, the product leakage rate of the battery pack 20 is calculated by the following calculation formula:

$$Q = \Delta C * P_t * V$$

Q: the product leakage rate, in unit of mbar·l/s, or Pa·m³/s;
ΔC: the rate of change of the content of the tracer gas in the test cavity 111, in unit of %/s;
$P_t$: the pressure in the test cavity 111, in unit of Pa;
V: the net volume in the test cavity 111, in unit of m³.

step 5: after the test is finished, opening the door 112 of the test container 11, removing the gas filling pipe 125 from the gas filling hole of the battery pack 20, and taking the battery pack 20 out of the test container 11.

Through the above leakage detection testing, if the product leakage rate is lower than a specified value, then it is determined that the sealing requirement of the battery pack is satisfied; if the product leakage rate is greater than the specified value, then it is determined that the sealing requirement of the battery pack is not satisfied.

The beneficial effects of the present invention are: the leakage detection method of the present invention can test the sealing performance of the battery pack under the atmospheric pressure, so that the battery pack can meet the corresponding sealing grade requirements of IP67 and IP68. The method not only solves the problem that the traditional gas detection method cannot meet the test requirements of IP67 and IP68 due to insufficient measurement precision, but also solves the problem that the traditional vacuum helium detection method will damage the battery cells in the battery pack.

The protection of the present invention is not limited to the above embodiments. Variations and advantages that may occur to those skilled in the art may be incorporated into the present invention without departing from the inventive concept, and the protection scope of the present invention should be defined by the appended claims.

What is claimed is:

1. A battery pack leakage detection system, comprising:
   a test container provided with a test cavity configured for accommodating the battery pack therein;
   a gas filling subsystem configured for filling an interior of the battery pack with a quantity of tracer gas;
   a gas stirring subsystem arranged in the test cavity and configured to stir air in the test cavity, such that leaked tracer gas that leaks out from the battery pack into the test cavity is accelerated to mix with the air in the test cavity for realizing a uniform distribution of the leaked tracer gas in the test cavity; and
   a test analysis subsystem configured for sampling mixed gas in the test cavity and analyzing the sampled gas to obtain a content of the leaked tracer gas in the test cavity, so as to determine whether a sealing requirement of the battery pack is satisfied or not according to the content of the leaked tracer gas in the test cavity;
   wherein the test container is a closed box for housing the battery pack during test of the battery pack, a support frame is provided below the test container, and the test container is supported on the support frame;
   the test container is provided with a door at one lateral side thereof for the entrance and exit of the battery pack, the gas stirring subsystem comprises at least one stirring fan mounted to an inner surface of a top plate of the test container, a conveying mechanism is provided in the test cavity and arranged on an inner surface of a bottom plate of the test container, and the conveying mechanism is configured for conveying the battery pack to enter or leave the test cavity via the door.

2. The system according to claim 1, wherein the gas filling subsystem comprises a vacuumizing device used to vacuumize the interior of the battery pack, a gas filling device used to fill the tracer gas into the interior of the battery pack, a pressure monitoring device used to monitor a pressure of the tracer gas in the interior of the battery pack, and a concentration monitoring device used to monitor a concentration of the tracer gas in the interior of the battery pack.

3. The system according to claim 1, wherein the gas filling subsystem is further configured for ensuring that, after the tracer gas is filled into the battery pack, an internal pressure of the interior of the battery pack is greater than a pressure in the test cavity.

4. The system according to claim 1, wherein an upper side of the test container is provided with a gas exhaust port configured for discharging the leaked tracer gas out of the test cavity.

5. The system according to claim 1, wherein the test analysis subsystem is a mass spectrum test analysis subsystem.

6. The system according to claim 5, wherein the test analysis subsystem comprises a mass spectrometer and a computing device, wherein the mass spectrometer is configured for sampling the mixed gas in the test cavity and performing mass spectrum analysis on the sampled gas to determine the content of the leaked tracer gas in the test cavity, the computing device is configured for calculating to obtain the product leakage rate of the battery pack.

7. The system according to claim 1, wherein the tracer gas is helium or hydrogen.

8. A battery pack leakage detection method using the battery pack leakage detection system as claimed in claim 1, comprising the following steps:
   step 1: filling a tracer gas into an interior of the battery pack;
   step 2: after the battery pack is filled with the tracer gas, placing the battery pack into a test cavity;
   step 3: stirring the air in the test cavity to accelerate the leaked tracer gas that leaks out from the battery pack to mix with the air in the test cavity such that the leaked tracer gas is uniformly distributed in the test cavity; and
   step 4: after a specified time period for testing is reached, sampling the mixed gas in the test cavity and analyzing the sampled gas to obtain the content of the leaked tracer gas in the test cavity, so as to determine whether the sealing requirement of the battery pack is satisfied or not according to the content of the leaked tracer gas in the test cavity.

9. The method according to claim 8, wherein in step 2, after the tracer gas is filled into the battery pack, an internal pressure of the interior of the battery pack is greater than a pressure in the test cavity, such that the filled tracer gas in the battery pack will leak into the test cavity through a potential leakage hole of the battery pack under the action of pressure difference, wherein the pressure in the test cavity is atmospheric pressure.

10. The method according to claim 8, wherein in step 4, the mixed gas in the test cavity is sampled in real-time during testing, and a mass spectrometer is provided to perform mass spectrum analysis in real-time on the sampled gas to obtain the rate of change of the content of the leaked tracer gas in the test cavity.

11. The method according to claim 10, wherein a product leakage rate of the battery pack is calculated by the following calculation formula:

$$Q = \Delta C * P_t * V$$

Q: the product leakage rate, in unit of mbar·l/s, or Pa·m³/s;

ΔC: the rate of change of the content of the tracer gas in the test cavity, in unit of %/s;

$P_t$: the pressure in the test cavity, in unit of Pa;

V: the net volume in the test cavity, in unit of m³;

if the product leakage rate is lower than a specified value, then it is determined that the sealing requirement of the battery pack is satisfied; and if the product leakage rate is greater than the specified value, then it is determined that the sealing requirement of the battery pack is not satisfied.

12. A battery pack leakage detection method using the battery pack leakage detection system as claimed in claim 1, comprising the following steps:

step 1: placing the battery pack into a test cavity and connecting a gas filling device with a gas filling hole of the battery pack through a gas filling pipe;

step 2: filling a tracer gas into an interior of the battery pack;

step 3: after the battery pack is filled with the tracer gas, stirring the air in the test cavity to accelerate the leaked tracer gas that leaks out from the battery pack to mix with the air in the test cavity such that the leaked tracer gas is uniformly distributed in the test cavity; and step 4: after a specified time period for testing is reached, sampling the mixed gas in the test cavity and analyzing the sampled gas to obtain the content of the leaked tracer gas in the test cavity, so as to determine whether the sealing requirement of the battery pack is satisfied or not according to the content of the leaked tracer gas in the test cavity.

13. The method according to claim 12, wherein in step 2, after the tracer gas is filled into the battery pack, an internal pressure of the interior of the battery pack is greater than a pressure in the test cavity, such that the filled tracer gas in the battery pack will leak into the test cavity through a potential leakage hole of the battery pack under the action of pressure difference, wherein the pressure in the test cavity is atmospheric pressure.

14. The method according to claim 12, wherein in step 1, the gas filling pipe is a hose.

15. The method according to claim 12, wherein in step 4, the mixed gas in the test cavity is sampled in real-time during testing, and a mass spectrometer is provided to perform mass spectrum analysis in real-time on the sampled gas to obtain the rate of change of the content of the leaked tracer gas in the test cavity.

16. The method according to claim 15, wherein a product leakage rate of the battery pack is calculated by the following calculation formula:

$$Q = \Delta C * P_t * V$$

Q: the product leakage rate, in unit of mbar·l/s, or Pa·m³/s;

ΔC: the rate of change of the content of the tracer gas in the test cavity, in unit of %/s;

$P_t$: the pressure in the test cavity, in unit of Pa;

V: the net volume in the test cavity, in unit of m³;

if the product leakage rate is lower than a specified value, then it is determined that the sealing requirement of the battery pack is satisfied; and if the product leakage rate is greater than the specified value, then it is determined that the sealing requirement of the battery pack is not satisfied.

\* \* \* \* \*